US008181023B2

(12) United States Patent
Sugiyama

(10) Patent No.: US 8,181,023 B2
(45) Date of Patent: May 15, 2012

(54) INFORMATION PROCESSING DEVICE AND INFORMATION PROCESSING SYSTEM

(75) Inventor: Hirokazu Sugiyama, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 847 days.

(21) Appl. No.: 12/022,245

(22) Filed: Jan. 30, 2008

(65) Prior Publication Data
US 2008/0189547 A1 Aug. 7, 2008

(30) Foreign Application Priority Data

Feb. 2, 2007 (JP) ................................ 2007-024649

(51) Int. Cl.
*H04L 9/32* (2006.01)
*G06F 7/04* (2006.01)
*G06F 13/00* (2006.01)

(52) U.S. Cl. ........... 713/169; 726/26; 711/100; 710/301

(58) Field of Classification Search ........................ None
See application file for complete search history.

(56) References Cited

U.S. PATENT DOCUMENTS

| | | | | |
|---|---|---|---|---|
| 4,960,983 A | * | 10/1990 | Inoue | 235/449 |
| 6,073,236 A | * | 6/2000 | Kusakabe et al. | 713/169 |
| 6,438,638 B1 | * | 8/2002 | Jones et al. | 710/301 |
| 7,114,179 B1 | * | 9/2006 | Ritter et al. | 726/7 |
| 7,350,230 B2 | * | 3/2008 | Forrest | 726/9 |
| 2008/0109662 A1 | * | 5/2008 | Natarajan et al. | 713/193 |
| 2008/0155271 A1 | * | 6/2008 | Barck et al. | 713/189 |

FOREIGN PATENT DOCUMENTS

| | | |
|---|---|---|
| JP | 10-020780 | 1/1998 |
| JP | 2005-122402 | 5/2005 |

* cited by examiner

*Primary Examiner* — William Powers
(74) *Attorney, Agent, or Firm* — Finnegan, Henderson, Farabow, Garrett & Dunner, L.L.P.

(57) ABSTRACT

An information processing device is provided with a tamper-proof IC chip that includes a storage area and that can process data from the storage area, and with a storage module that includes a storage area external to the IC chip. First key data stored in the IC chip storage area and second key data stored in the storage module storage area are used for two-way authentication between the IC chip and the storage module and for encrypting and decrypting data in the storage module storage area. The IC chip storage area includes a cache area to temporarily store data. The IC chip, following a request by an external device, uses the key data for two-way authentication with the storage module, securely reads data to satisfy the request from the storage module storage area into the IC chip cache area, and processes the data read into the cache area.

21 Claims, 7 Drawing Sheets

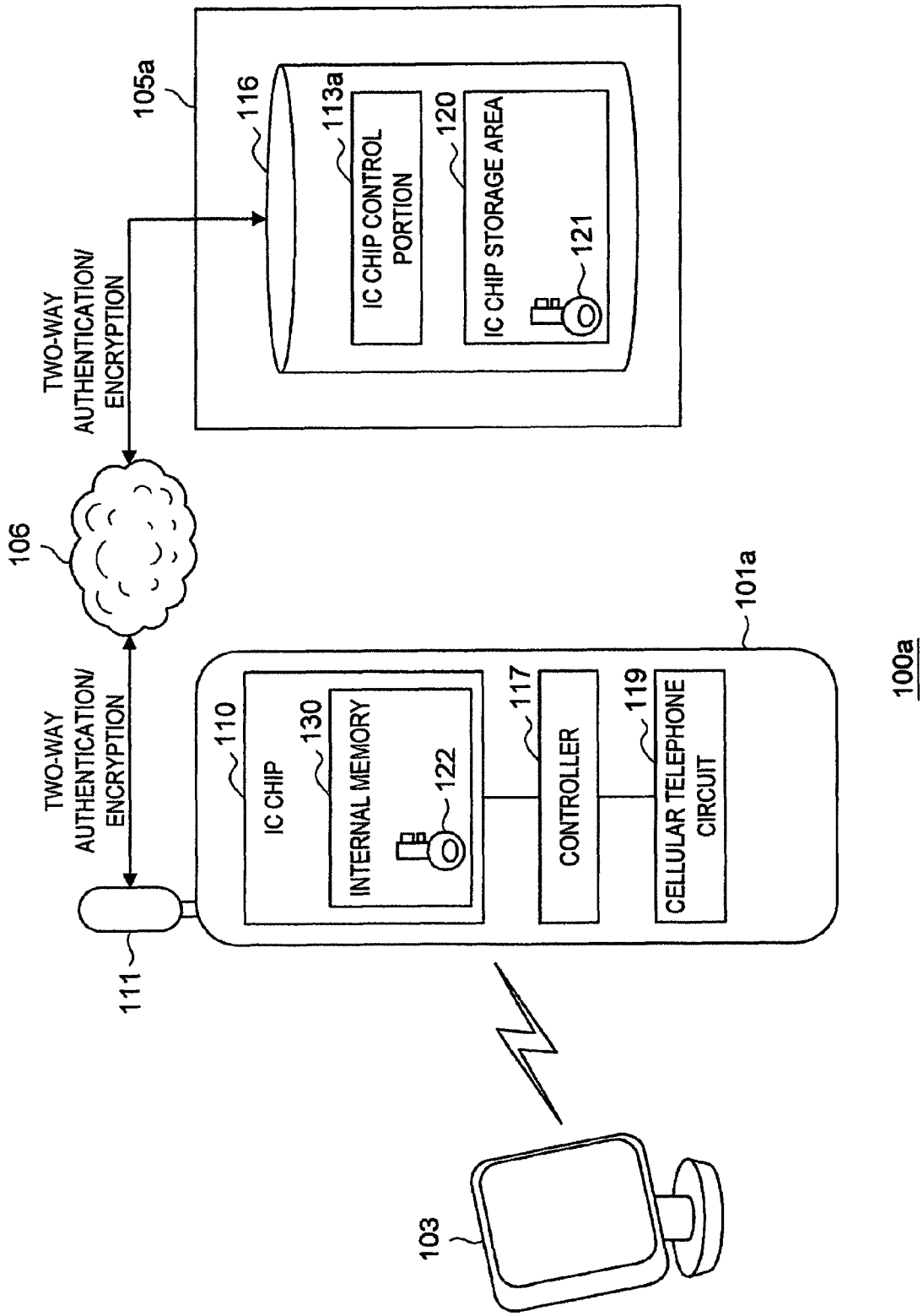

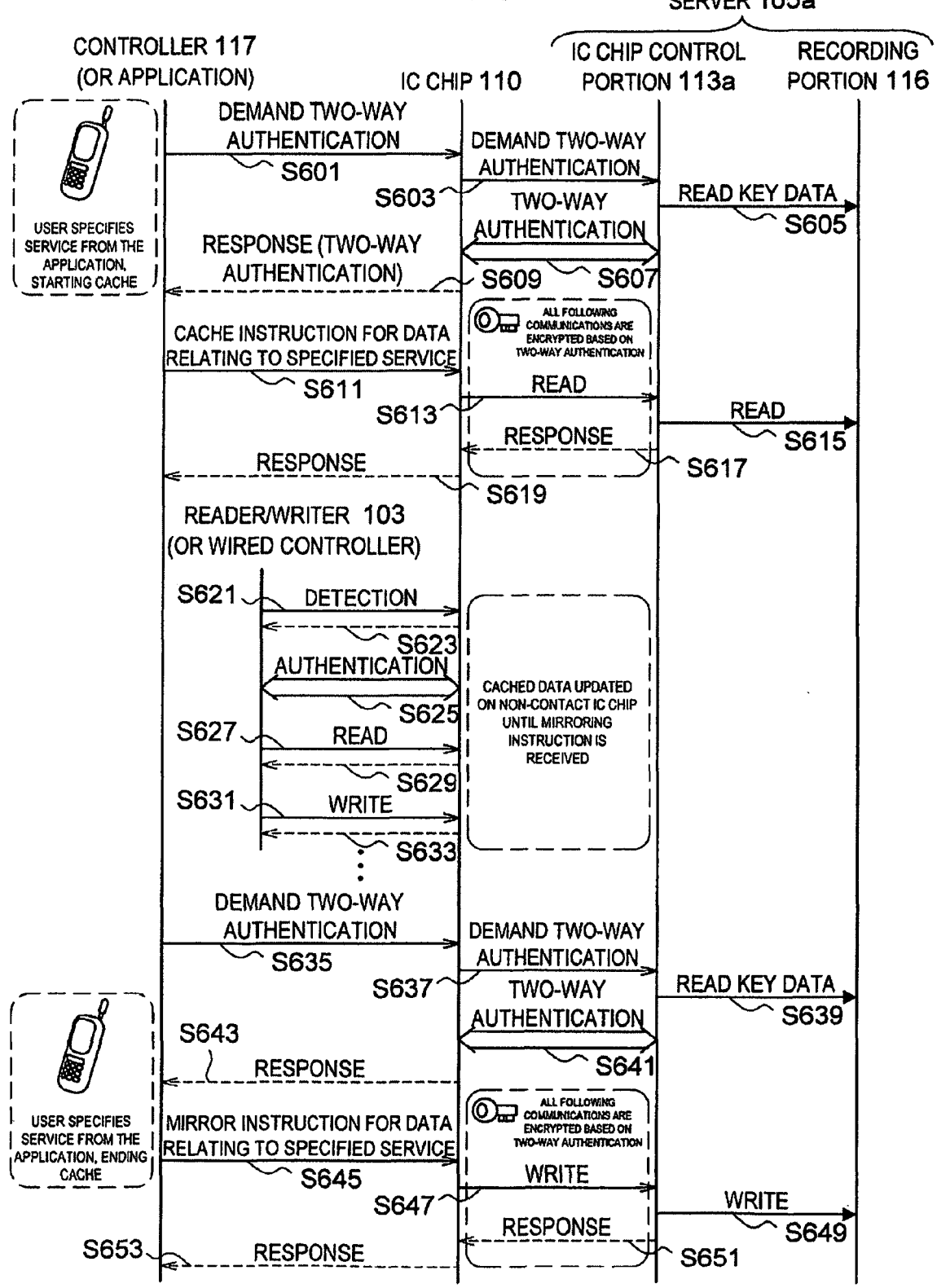

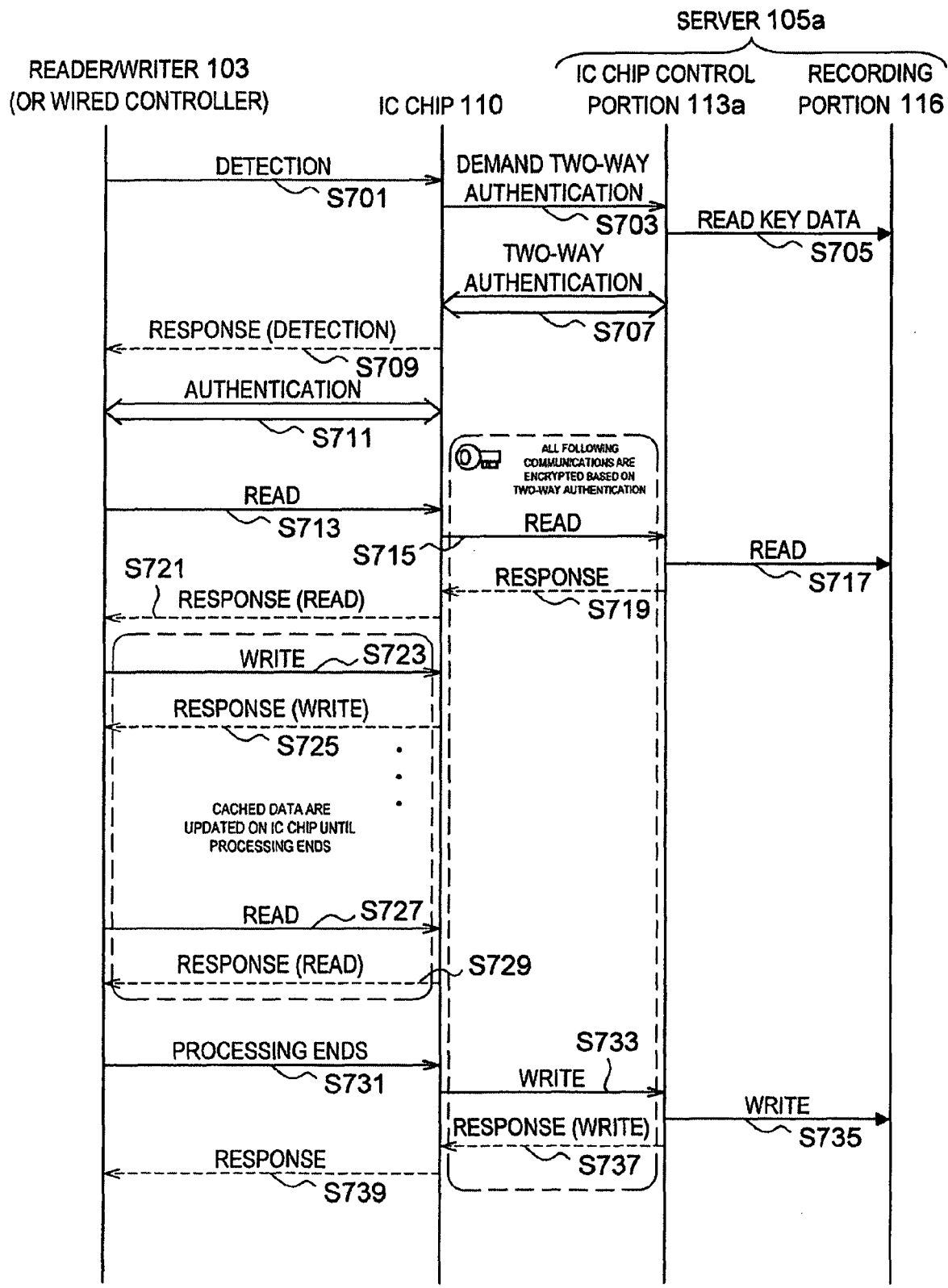

INFORMATION PROCESSING DEVICE AND INFORMATION PROCESSING SYSTEM

CROSS REFERENCES TO RELATED APPLICATION(S)

The present invention contains subject matter related to Japanese Patent Application JP 2007-024649 filed in the Japan Patent Office on Feb. 2, 2007, the entire contents of which being incorporated herein by reference.

BACKGROUND OF THE INVENTION

1. Field of the Invention

The present invention relates to an information processing device that includes an IC chip, and an information processing system.

2. Description of the Related Art

In recent years, there has been a spread in non-contact integrated circuit (IC) cards and in information processing devices that can perform communications without contact with a reader/writer, such as mobile telecommunication devices, including mobile telephones, with built-in modularized non-contact IC cards as IC chips, or the like (see Japanese Patent Application Publication JP-A-10-020780). Transceiving systems using these information processing devices are found in a wide range of applications, such as station ticket barrier systems, payment systems or the like.

With the above-mentioned ticket barrier systems or retail outlet payment systems or the like, for example, when a reader/writer connected to a cash register in the store is scanned by an information processing device with a built-in IC chip, the information stored on the IC chip relating to the amount of money is read via the electro-magnetic field generated by the reader/writer, and the information relating to the amount of money following payment is written out. This system allows the consumer to receive a service for the purchase of products.

In line with improved IC chip performance, more advanced services can be offered. Therefore, data being handled in the future will be more complex and be larger in volume. As a result, shortages are expected to occur in the free memory space available on IC chips.

To avoid shortages in the free memory space on IC chips, consideration could be given to the development of IC chips with a large-capacity memory. However, an increase in chip size and rising costs prove to be major obstacles in the manufacture of IC chips with a large-capacity memory.

Here, as a possible measure to avoid shortages in the free memory space available on IC chips at a comparatively low cost, a storage medium, such as a memory or the like, that can be externally connected to an IC chip can be newly attached, in order to expand the storage space. This design is disclosed, for example, in Japanese Patent Application Publication JP-A-10-020780.

SUMMARY OF THE INVENTION

However, in comparison to an IC chip internal memory, access speed is slower when using the above-mentioned storage medium, where an external memory or the like offers a larger capacity than the IC chip internal memory. The slower access speed has a large impact on the IC chip processing time, leading to concerns that processing cannot be completed within the time limits required, depending on the service being offered.

Some services using IC chips have extremely stringent processing time requirements. These include, for example, exit and entry processing, such as automatic ticket barrier machines or the like.

In such services, if the addition of the above-mentioned storage medium, such as an external memory or the like, leads to delays in the IC chip processing time, the service cannot be smoothly performed, with a clear negative impact on the convenience of use, which results in a lack of confidence by the user.

Further, the use of a storage medium, such as an external memory or the like, means that data is stored externally to the IC chip, requiring consideration for the security of the data stored on the storage medium, such as an external memory or the like.

The present invention provides a new and improved information processing device and information processing system that allow effective data management through the use of the storage space of a storage medium provided externally to an IC chip.

According to an embodiment of the present invention, there is provided a tamper-proof IC chip that includes a storage area and that can read and process data from the storage area, and a storage module that includes a storage area provided externally to the IC chip, where first key data is stored in the IC chip storage area for, at least one of, the purpose of performing two-way authentication between the IC chip and the storage module, and the purpose of encrypting and decrypting data stored in the storage area of the storage module. Second key data is stored in the storage area of the storage module for, at least one of, the purpose of performing the two-way authentication between the IC chip and the storage module, and the purpose of encrypting and decrypting data stored in the storage area of the storage module. A cache area is allocated to the IC chip storage area to temporarily store data, and the IC chip, in accordance with a request from an external device, after performing the two-way authentication with the storage module based on the first key data, securely reads specified data necessary to satisfy the request from the external device from the storage area of the storage module into the cache area of the IC chip, and processes one of a part of the data and all of the data read into the cache area.

According to the present invention, the information processing device, in response to a request from an external device, securely reads the necessary data to satisfy the request from the external device from the storage area of the storage module into the cache area, and processes the read data according to the request from the external device. According to this structure, whenever there is a command from the external device, data on the storage module provided externally to the IC chip does not have to be read from the storage module by the IC chip, but the data already read to the cache area can be processed, thus minimizing a deterioration in IC chip processing speed. Also, even though data exists externally to the IC chip, it can be read from the storage module in a secure manner and security can therefore be maintained. The external device is a device that is able to give instructions to the IC chip, and may be, for example, a reader/writer or a controller or the like.

The information processing device is a mobile terminal, where the storage module further includes an access control portion (for example, the IC chip control portion in the present specification) included in the mobile terminal to perform two-way authentication with the IC chip and also control access to the storage area in the storage module. The storage area of the storage module is provided internally in a non-volatile memory that can perform processing on the data, the processing including reading, writing and deleting the data. The IC chip may read the encrypted data existing in the storage area of the storage module from the access control portion and process the data. The storage module is able to perform processing on the data, the processing including writing the data into the storage area and reading the data from the storage area. A structure may be adopted in which, among the portions of the storage module, only the access portion is provided internally in the mobile device.

The non-volatile memory may also be structured such that it can be attached or removed from the information processing device. In this structure, the non-volatile memory can be carried independently and separately from the information processing device.

The information processing device is a mobile terminal, where the storage module further includes an access control portion (for example, the IC chip control portion in the present specification) provided externally to the mobile terminal to perform two-way authentication with the IC chip via a communications network and also control access to the storage area in the storage module. The IC chip may read the encrypted data existing in the storage area of the storage module from the access control portion via the communications network and process the data. The storage module is able to perform processing on the data, the processing including writing the data into the storage area and reading the data from the storage area, and the storage area and the access control portion are integrated as one unit and provided externally to the mobile terminal, as described above.

When data processing that extends over at least one processing step by the IC chip in accordance with a request from an external device is complete, the access control portion, in accordance with instructions from the IC chip, may instruct that the processed data stored in the cache area is to be stored in the storage area of the storage module. With this structure, it is possible to ensure the consistency of the data in the cache area with the data in the storage module.

According to another embodiment of the present invention, there is provided an information processing system that connects to an external recording device and an information processing device via a communications network, the information processing device including a tamper-proof IC chip that includes a storage area and that can read and process data from the storage area. The external recording device includes a storage area and an access control portion that performs two-way authentication with the IC chip via a communications network and that controls access to a storage area of the external recording device. First key data is stored in the IC chip storage area for, at least one of, the purpose of performing two-way authentication between the IC chip and the access control portion of the external recording device and the purpose of encrypting and decrypting data stored in the storage area of the external recording device. Second key data is stored in the storage area of the external recording device for, at least one of, the purpose of performing two-way authentication between the IC chip and the access control portion of the external recording device and the purpose of encrypting and decrypting data stored in the storage area of the external recording device. A cache area is allocated to the storage area of the IC chip to temporarily store data, and the IC chip, in accordance with a request from an external device, after performing the two-way authentication with the access control portion via the communications network based on the first key data, securely reads specified data necessary to satisfy the request from the external device from the storage area of the external recording device into the cache area of the IC chip, and processes one of a part of the data and all of the data read into the cache area. The external recording device can perform processing on data in response to a request from the information processing device, the processing including writing of the data into the storage area contained within the device, and reading of the data from the storage area.

According to another embodiment of the present invention, there is provided an information processing device that connects to an external recording device via a communications network. The information processing device includes a tamper-proof IC chip that includes a storage area and that can process data read from the storage area, and the external recording device includes an access control portion that performs two-way authentication between a storage area and the IC chip via the communications network and controls access to the storage area of the external recording device. First key data is stored in the IC chip storage area for, at least one of, the purpose of performing two-way authentication between the IC chip and the access control portion of the external recording device and the purpose of encrypting and decrypting data stored in the storage area of the external recording device. Second key data is stored in the storage area of the external recording device for, at least one of, the purpose of performing two-way authentication between the IC chip and the access control portion of the external recording device and the purpose of encrypting and decrypting data stored in the storage area of the external recording device. A cache area is allocated to the storage area of the IC chip to temporarily store data, and the IC chip, in accordance with a request from an external device, after performing the two-way authentication with the access control portion via the communications network based on the first key data, securely reads specified data necessary to satisfy the request from the external device from the storage area of the external recording device into the cache area of the IC chip, and processes one of a part of the data and all of the data read into the cache area.

The IC chip may read the encrypted data existing in the storage area of the storage module from the access control portion via the communications network, and process the data.

The first key data stored in the IC chip storage area may have a one-to-one correspondence with the second key data stored in the storage area of the external recording device.

According to the embodiments of the present invention described above, data can be read from a storage area of a storage module provided externally to an IC chip into a cache area, allowing effective processing of the data.

BRIEF DESCRIPTION OF THE DRAWING(S)

FIG. 5 is a block diagram schematically showing the structure of an information processing system according to a second embodiment;

FIG. 6 is a sequence diagram schematically showing the operations of the information processing system according to the second embodiment; and FIG. 7 is a sequence diagram schematically showing a modified example of the operations of the information processing system according to the second embodiment.

DETAILED DESCRIPTION OF THE PREFERRED EMBODIMENT(S)

Figure 1:
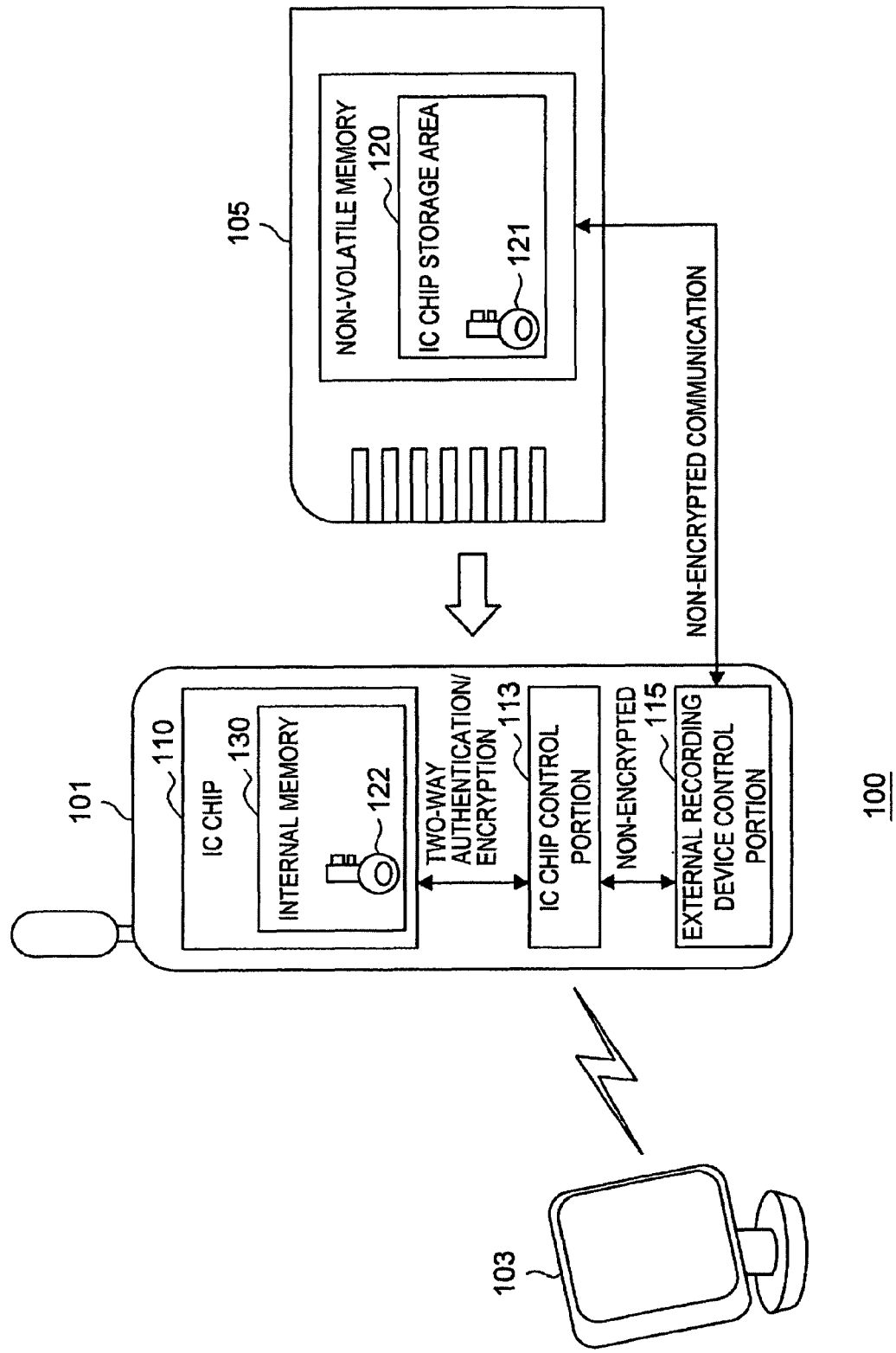
FIG. 1 is a block diagram schematically showing the structure of an information processing system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, an information processing system 100 according to a first embodiment of the present invention will be explained with reference to FIG. 1. FIG. 1 is a block diagram schematically showing the structure of an information processing system according to the first embodiment.

As shown in FIG. 1, the information processing system 100 includes, as main members, an information processing device 101, a reader/writer 103, and a non-volatile memory 105 that acts as an external recording device (or external storage device). As shown in FIG. 1, the information processing system 100 is a mobile terminal equipped with telephone calling or data communication functions or the like.

According to the first embodiment, data is safely and speedily read using a memory (hereinafter, an internal memory 130) within a tamper-proof IC chip 110 that is built into the information processing device 101 and using the non-volatile memory 105 (or external memory) that is provided externally to the IC chip as an external recording device.

Information Processing Device 101

With reference to FIG. 1, the information processing device 101 includes the IC chip 110, an IC chip control portion 113, and an external recording device control portion 115 as main members.

The IC chip 110 can communicate wirelessly with the reader/writer 103 that is provided externally to the information processing device 101. At that time, the IC chip 110 in the information processing device 101 is driven by the reception of power supplied by the electromagnetic waves generated by the reader/writer 103.

The IC chip control portion 113 uses key data 121 stored in an IC chip storage area 120 kept in the non-volatile memory 105 to conduct two-way authentication with the IC chip 110 that holds key data 122 in the internal memory 130.

The IC chip control portion 113, after carrying out two-way authentication with the IC chip 110, can read data from the non-volatile memory 105 and transmit the data to the IC chip 110, or can store data received from the IC chip 110 to the IC chip storage area 120 in the non-volatile memory 105.

If the IC chip control portion 113 according to the first embodiment of the present invention is mounted on the information processing device 101, it may be either a hardware or a software.

The external recording device control portion 115 can detect when the non-volatile memory 105, namely the external recording device, is attached to the information processing device 101 and can transmit the detected results to the IC chip control portion 113.

Non-Volatile Memory 105

As shown in FIG. 1, the IC chip storage area 120 for the IC chip 110 is kept in the non-volatile memory 105. The key data 121 is stored in the IC chip storage area 120 to allow two-way authentication with the IC chip 110. The structure of the IC chip storage area 120 may be, for example, a tamper-proof structure that does not allow the key data 121 to be easily manipulated or stolen.

The non-volatile memory 105 may be, for example, an electronically erasable programmable read-only memory (EEPROM), a flash memory or a ferroelectric random access memory (FeRAM) or the like.

The information processing device 101, for example, includes a mechanism (not shown in the figures) that allows the external recording device, the non-volatile memory 105, to be attached to or removed from the information processing device 101 so that the non-volatile memory 105 can be attached to the information processing device 101.

When the non-volatile memory 105 is attached to the information processing device 101, the IC chip 110 or the IC chip control portion 113 can be connected to the non-volatile memory 105.

When the non-volatile memory 105 is attached to the information processing device 101 and can be connected, if the IC chip storage area 120 does not exist, in accordance with instructions from the data management portion 136 in the IC chip 110, for example, the IC chip control portion 113 may secure a specified area in the IC chip storage area 120 in the storage area in the non-volatile memory 105, the data management portion 136 may generate the key data 121 for two-way authentication with the IC chip 110, and the IC chip control portion 113 may store the key data 121 in the IC chip storage area 120. An explanation of the data management portion 136 will later be given with reference to FIG. 2.

In the above description, a structure is explained in which the non-volatile memory 105 according to the first embodiment is attached to the information processing device 101. However, the invention is not limited to the above-described example. For example, the non-volatile memory 105 may be externally connected to the information processing device 101 via a USB cable or the like, or may be built into the information processing device 101 or the like.

In the above description, the external recording device according to the first embodiment is explained as the non-volatile memory 105. However, as long as data can be stored and can be read at a certain speed, the invention is not limited to the above-described example. For example, the recording device may be a magnetic recording device, such as a hard disk drive or the like, a recording and replay device that reads and writes an optical recording medium, or a recording device that reads and writes a magneto-optical recording medium, or the like.

IC Chip 110 Structure

Figure 2:
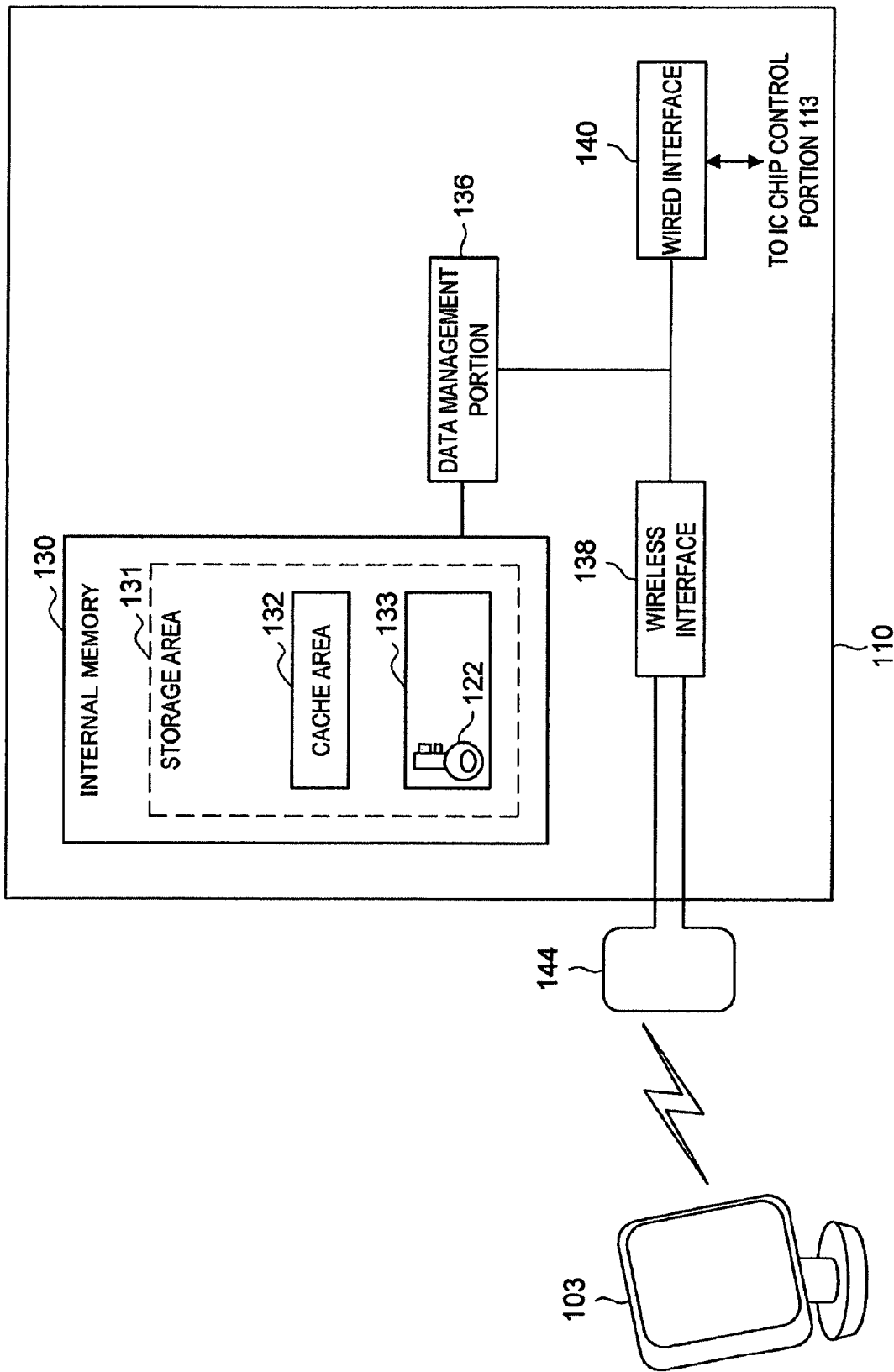
FIG. 2 is an explanatory diagram schematically showing the structure of an IC chip according to the first embodiment.

The IC chip structure will now be explained in more detail with reference to FIG. 2. FIG. 2 is an explanatory diagram schematically showing the structure of the IC chip 110 according to the first embodiment.

As shown in FIG. 2, the IC chip 110 includes the internal memory 130, a data management portion 136, a wireless interface 138, a wired interface 140, and an antenna 144 as main members. The IC chip 110 is tamper-proof to inhibit illegal external access.

As shown in FIG. 2, the internal memory 130 includes a storage area 131. The storage area 131 contains a cache area 132 for data recorded in the non-volatile memory 105 that is the external memory, and a key data area 133 that stores the key data 122 required for two-way authentication with the non-volatile memory 105 and/or for the encryption and decryption of data stored in the non-volatile memory 105.

The key data 122 stored in the key data area 133 has a one-to-one correspondence with the key data 121 stored in the IC chip storage area 120 in the non-volatile memory 105. Therefore, whenever the non-volatile memory 105 or the IC chip storage area 120 is changed, it is necessary to create a new key to establish the key data 122 and the key data 121 as a key pair. The control management portion 136 can be used, for example, to create the key data 121 and the key data 122, but the invention is not limited to this example.

The internal memory 130 can be accessed relatively more quickly than the non-volatile memory 105, so from among the data stored in the non-volatile memory 105, data required, for example, in response to a demand from the reader/writer 103 can be kept as cache data in the cache area 132 in the internal memory 130, to allow high-speed memory access.

The data stored in the internal memory 130 is referred to above as cache data. However, the cache data is not necessarily limited to data temporarily kept in the internal memory 130 and may be data that is kept permanently in the internal memory 130.

The data management portion 136 controls the operation of each of the members provided in the IC chip 110. For example, when performing data processing, such as reading data from the non-volatile memory 105 to the cache area 132, the data management portion 136 uses the key data 122 to implement the two-way authentication with the IC chip control portion 113. When mutual authenticity has been confirmed using the two-way authentication process, subsequent processing is executed, but if mutual authenticity is not confirmed, processing is ended without any subsequent processing being executed. An explanation of the two-way authentication process will follow later.

Using the key data 122 stored in the internal memory 130, the data management portion 136 encrypts the data to be stored in the non-volatile memory 105 and decrypts the data read from the non-volatile memory 105 and writes it into the cache area 132.

Hereinafter, data that has been encrypted will be referred to as encrypted data. The data management portion 136 encrypts or decrypts data using the key data 122 stored in the internal memory 130, but the invention is not limited to this example, and the data management portion 136 may, for example, also encrypt or decrypt data using separate key data (not shown in the figures) that is stored in the key data area 133.

As well as controlling the members provided in the IC chip 110, the data management portion 136 can also, in conjunction with the IC chip control portion 113, access the non-volatile memory 105.

When accessing the non-volatile memory 105, the data management portion 136 encrypts or decrypts data. Note that the data management portion 136 may be, for example, a processing unit such as a CPU, and all functions may be realized by a program or programs stored in the internal memory 130 or another recording device (not shown in the figures).

In the present patent specification, access is used as an overall term to encompass, for example, the reading of data, the writing of data, the deletion of data, connection to an information processing device or external recording device, the processing of data via a wired or wireless connection, and the like. However, the term is not limited to these examples and may incorporate other meanings.

The data management portion 136, for example, can encrypt or decrypt data based on the Data Encryption Standard (DES) or the Advanced Encryption Standard (AES) or the like. The DES is a typical example of shared-key cryptography, while Triple-DES is a method where the normal DES encryption process is repeated three times. The AES is the US government's next-generation standard cipher adopted by the US National Institute of Standards and Technology (NIST).

The wireless interface 138 possesses functions to communicate wirelessly via the antenna 144 with the reader/writer 103 or other device.

Specifically, the wireless interface 138 relays the data received from the reader/writer 103 to the data management portion 136. Further, the wireless interface 138 transmits the data transferred from the data management portion 136 to the reader/writer 103 via the antenna 144.

The wired interface 140 transmits the data transferred from the data management portion 136 to the IC chip control portion 113 and also transmits the data transferred from the IC chip control portion 113 to the data management portion 136.

The antenna 144 shown in FIG. 2 may be, for example, a loop antenna that receives the transmission signal by receiving the wireless carrier waves transmitted by the reader/writer 103, and also generates an induced electromotive force using the wireless carrier waves. The antenna 144 can also send the transmission signal generated by the wireless interface 138 to the reader/writer 103.

Data Structure

Next, with reference to FIG. 1 to FIG. 3, a simple explanation will be given of the structure of the data in the internal memory 130 and the non-volatile memory 105 storage areas according to the first embodiment.

Figure 3:
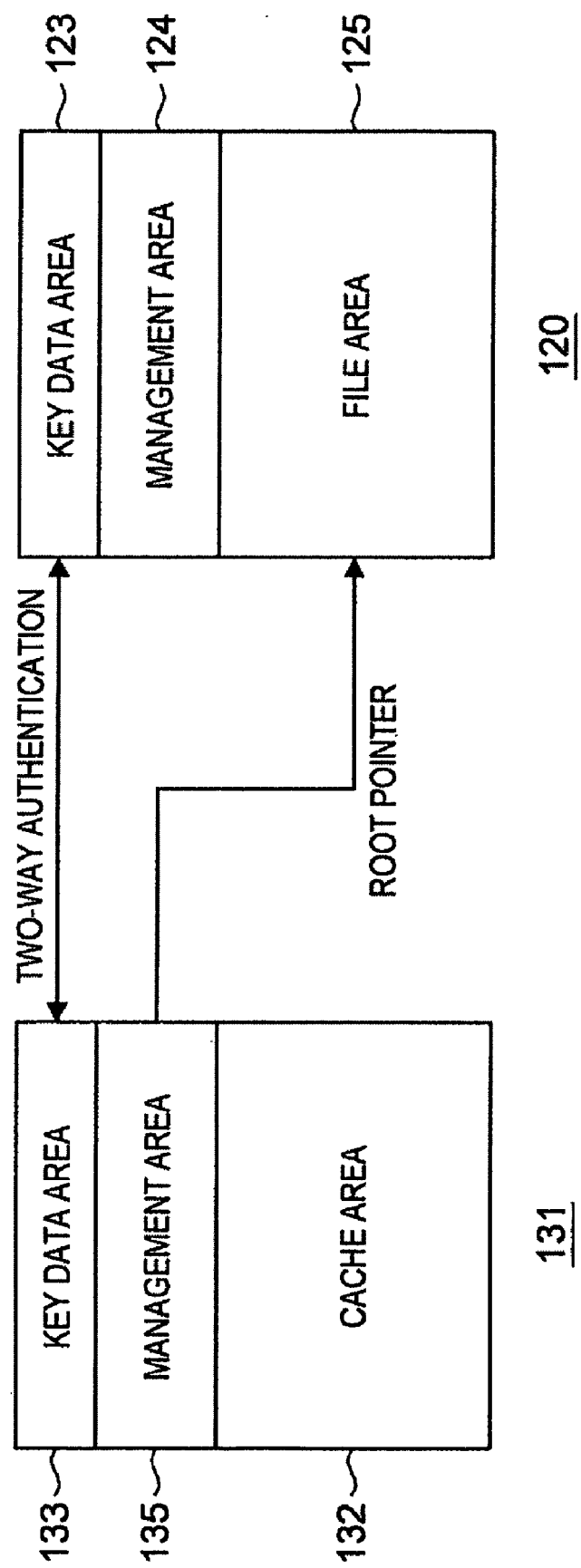
FIG. 3 is an explanatory diagram schematically showing the structure of data recorded in a storage area according to the first embodiment.

As shown in FIG. 3, the storage area 131 in the internal memory 130 contains a key data area 133, where at least one key data 122 are stored, a management area 135 and a cache area 132.

Also, as shown in FIG. 3, the IC chip storage area 120 in the non-volatile memory 105 contains a key data area 123 where key data 121 is stored, a management area 124 and a file area 125 where file systems are stored.

The management area 135 is used to record file system management data for the management of file systems stored in the file area 125 in the IC chip storage area 120 in the non-volatile memory 105.

As shown in FIG. 3, the management area 135 also contains pointer data used to access the root directory for the file systems stored in the file area 125. For example, assuming that the data relating to the root directory is stored in memory address 1000 in the file area 125, the pointer data for the memory address 1000 will be stored in the management area 135.

The management area 124 contains the storage area management data necessary to manage the storage area 131 on the IC chip 110 side.

The file systems stored in the file area 125 are, for example, categorized by service according to a service number or the like, and are formed of various types of data for each service, such as information relating to the size of the storage area held (the number of blocks and the like), information about the remaining balance of the electronic money used by the service, log information or the like.

In addition, to ensure that the file systems stored in the file area 125 maintain roughly equivalent security as when the data is stored in the internal memory 130, the file systems are stored in an encrypted format, the encryption being performed by the IC chip 110.

Data Processing

Figure 4:
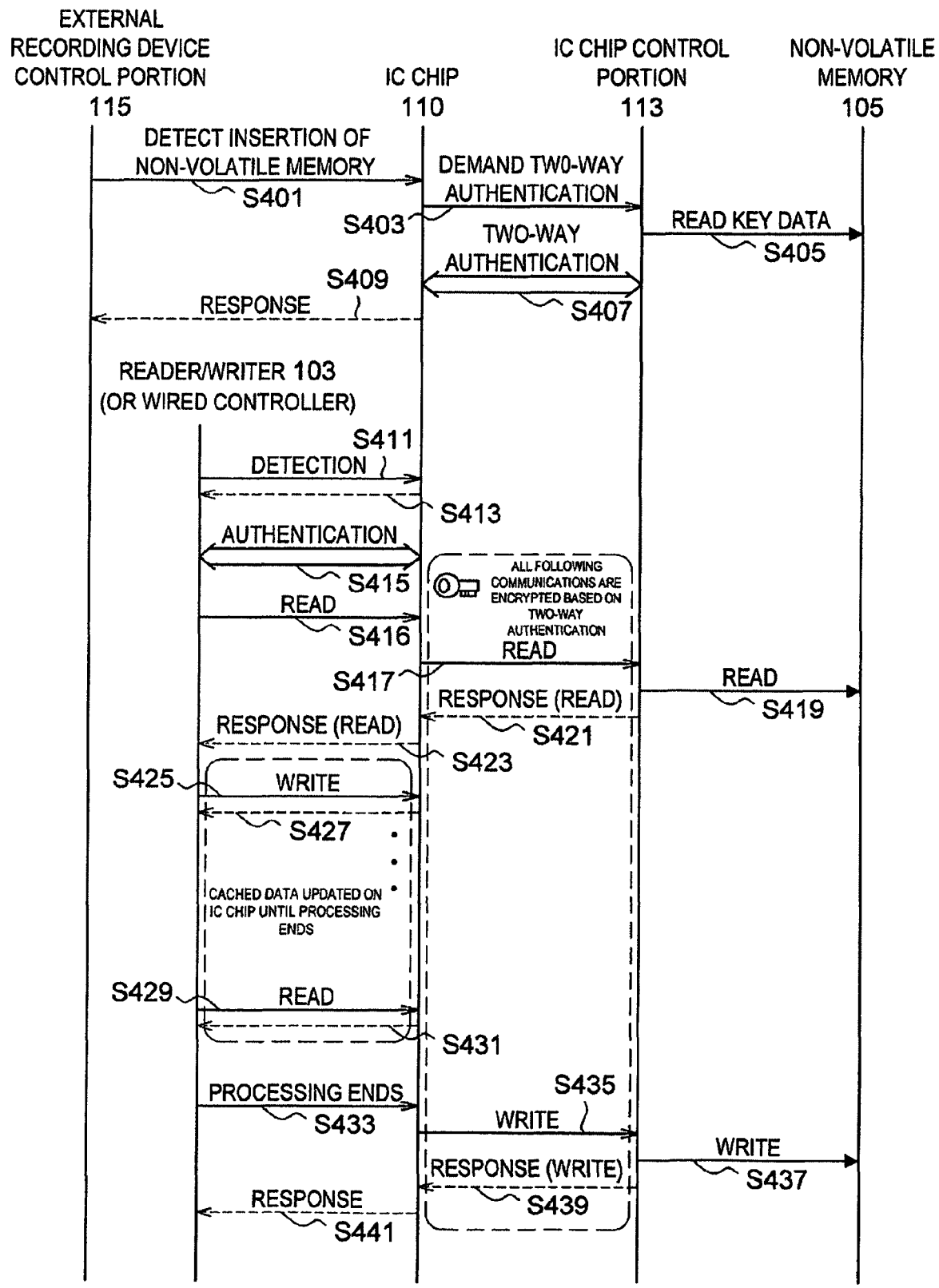
FIG. 4 is a sequence diagram schematically showing the operations of the information processing system according to the first embodiment.

Next, data processing by the information system 100 according to the first embodiment will be explained with reference to FIG. 4. FIG. 4 is a sequence diagram schematically showing the operations of the information processing system 100 according to the first embodiment.

As shown in FIG. 4, first, when a user attaches the non-volatile memory 105 to the information processing device 101, an external recording device control portion 115 detects the non-volatile memory 105, and notifies this by transmitting detection information to the IC chip 110 indicating that the non-volatile memory 105 has been detected (step S401).

When the IC chip 110 receives the detection information from the external recording device control portion 115, in order to perform two-way authentication with the non-volatile memory 105, the IC chip 110 data management portion 136 issues a two-way authentication request to the IC chip control portion 113 (step S403).

When the IC chip control portion 113 receives the request from the IC chip 110 for two-way authentication with the non-volatile memory 105, it accesses the non-volatile memory 105 IC chip storage area 120 via the external recording device control portion 115, and reads the key data 121 (step S405).

When the key data 121 is read from the non-volatile memory 105, the IC chip control portion 113, on behalf of the non-volatile memory 105, which is the object of the two-way authentication, starts two-way authentication with the IC chip 110 (step S407).

The two-way authentication between the IC chip control portion 113 and the IC chip 110 (step S407), for example, is performed such that random digits are generated by the IC chip control portion 113, where the random digits are then encrypted using the key data 121, and transmitted to the IC chip 110. The IC chip 110 data management portion 136 decrypts the received data using the key data 122, and if the data can be successfully decrypted, the data management portion 136 determines the IC chip control portion 113 to be authentic. Further, the data management portion 136 generates random digits, encrypts them using the key data 122, and transmits them to the IC chip control portion 113. The IC chip control portion 113 decrypts the received data using the key data 121, and if the data can be successfully decrypted, the IC chip control portion 113 determines the IC chip 110 to be authentic. In the above way, the two-way authentication between the IC chip 110 and the IC chip control portion 113 (step S407) is completed. However, the invention is not limited to the process described in the present example, and two-way authentication can be achieved through the use of other methods.

Furthermore, when performing the two-way authentication (step S407), the data management portion 136 and the IC chip control portion 113 may process the read key data 121 and 122 in accordance with specified algorithms or the like, and then use the processed data as the key data for the purpose of two-way authentication, or the like.

If the results of the two-way authentication between the IC chip control portion 113 and the IC chip 110 (step S407) confirm both to be authentic, two-way authentication is performed between the IC chip 110 and the non-volatile memory 105.

When the two-way authentication process (step S407) is completed, the non-volatile memory 105 detection results, along with the two-way authentication results, are transmitted from the IC chip 110 to the external recording device control portion 115 via the IC chip control portion 113 (step S409).

If the detection results do not confirm the two-way authentication, even if a request for access to the IC chip storage area 120 in the non-volatile memory 105 is issued by the IC chip control portion 113 or the like, the external recording device control portion 115 either, for example, ignores the request or generates a request error response. However, the invention is not limited to these examples.

Next, when the IC chip 110, by receiving signals (beacon signals or the like) transmitted from the reader/writer 103 or a wired controller or other device, detects the reader/writer 103 or other device (step S411), the IC chip 110 transmits a signal to the reader/writer 103 or other device indicating that it has been detected (step S413).

Next, authentication is performed between the IC chip 110 and the detected reader/writer 103 or other device (step S415). The authentication between the IC chip 110 and the reader/writer 103 or other device may, for example, be performed in the same way as for the above-described two-way authentication process between the IC chip 110 and the IC chip control portion 113. However, the invention is not limited to this example.

If the authentication process (step S415) is completed successfully, next, the IC chip 110 receives a read data request from the reader/writer 103 or other device (step S416).

The data targeted by the data read request (step S416) is, for example, a data set (at least one block of data) required in a series of processes being performed from this point between the reader/writer 103 or other device and the IC chip 110 (steps S425 to S431).

When the data management portion 136 ascertains that the data targeted by the data read request generated by the reader/writer 103 or other device exists in the IC chip storage area 120 in the non-volatile memory 105, the data management portion 136 instructs the IC chip control portion 113 to read the target data from the non-volatile memory 105 (step S417). From this point, data communications between the IC chip 110 and the IC chip control portion 113 can be performed securely as the transmitted and received data are encrypted using the key data 121 and the key data 122.

Next, the IC chip control portion 113 reads the target data from the IC chip storage area 120 in the non-volatile memory 105 (step S419).

The data read in the above step S419 is transmitted to the IC chip 110 by the IC chip control portion 113 via the external recording device control portion 115 (step S421).

The data management portion 136 decrypts the data received from the IC chip control portion 113 via the wired interface 140 and stores the data in the cache area 132 in the internal memory 130.

Next, when the target data is stored in the cache area 132 by the data management portion 136, the data reader/writer 103 or other device is notified that the data has been stored in the cache area 132 (step S423).

Next, if the reader/writer 103 or other device requests processing of the data read into the cache area 132, the processing including updating the data, deleting the data and the like (step S425), the data management portion 136 processes the data in accordance with the processing request, and updates the data. The data management portion 136 notifies the reader/writer 103 or other device of the processing results via the antenna 144 (step S427).

In the same way, if there is a request from the reader/writer 103 or other device to once more process the data stored in the cache area 132, the data management portion 136 updates the data as described above. The updated data in the cache area 132 is held in the cache area 132 until the series of processes between the reader/writer 103 or other device and the IC chip 110 is complete.

Also, when the IC chip 110 receives a request from the reader/writer 103 or other device to read the data in the cache area 132 (step S429), the IC chip 110 reads the data that is the target of the request from the non-volatile memory 105 and transmits the data to the reader/writer 103 or other device (step S431). The data transmitted wirelessly to the reader/writer 103 or other device from the IC chip 110 is transmitted securely as the data is encrypted using the keys valid between the reader/writer 103 and the IC chip 110.

From this point, until an end command for the series of processes is received from the reader/writer 103 or other device, processes are repeated as in the above steps S425 to S431, including reading data from the cache area 132, updating data in the cache area 132 and the like.

Next, when the series of processes between the reader/writer 103 and the IC chip 110, including reading the data and writing the data, is complete, the reader/writer 103 instructs the IC chip 110 to end processing (step S433).

When the IC chip 110 data management portion 136 receives the instruction from the reader/writer 103 to end processing, to obtain consistency between the data updated in the cache area 132 up to that time and the data stored in the IC chip storage area 120 in the non-volatile memory 105, in other words, to mirror the updated data contents with the data stored in the IC chip storage area 120, the data management portion 136 sends a data write command to the IC chip control portion 113 (step S435).

At the time of the data write command (step S435), the data management portion 136 encrypts the data in the cache area 132 using the key data 122.

The IC chip control portion 113 receives the data write command from the data management portion 136, and updates the designated data in the IC chip storage area 120 in the non-volatile memory 105 to the encrypted data designated by the write command, so that it is the same as the updated data in the cache area 132 (step S437).

When the IC chip control portion 113 has completed updating all the data designated by the command received from the data management portion 136 (step S437), a write done response is generated to the IC chip 110 (step S439).

When the IC chip 110 data management portion 136 receives the write done response from the IC chip control portion 113, it generates a write done response to the reader/writer 103 via the antenna 144 (step S441).

In the processes (step S435 to step S439) to mirror the updated data in the cache area 132, if there is a multiplicity of data in the cache area 132, the processes from the data write command (step S435) to the write done response (step S439) are repeated multiple times.

Also, when the writing of all the data into the non-volatile memory 105 is complete, the data management portion 136 deletes the data held in the cache area 132 up to that time, but, depending on the status of free space and the like in the cache area 132, the data may be kept as it is.

The series of operations by the information system 100 according to the first embodiment of the present invention are complete. Through the operations of the information processing system 100, the number of access operations between the non-volatile memory 105 and the IC chip 110 required to update the data read from the cache area 132 can be reduced, allowing the impact on processing time to be reduced to a minimum. Also, the data in the non-volatile memory 105 is encrypted, allowing the IC chip 110 internal memory 130 storage area to be expanded without any significant deterioration in the security level.

Second Embodiment

Next, an information system 100a according to a second embodiment of the present invention will be explained. Here, particular explanation will be made of the points of difference between the above-described information system 100 according to the first embodiment and the information system 100a according to the second embodiment. The explanation relating to the other points is essentially identical to the explanation for the first embodiment and will therefore be omitted.

First, the structure of the information processing system 100a according to the second embodiment will be explained with reference to FIG. 5. FIG. 5 is a block diagram schematically showing the structure of the information processing system 100a according to the second embodiment.

As shown in FIG. 5, the information system 100a includes an information processing device 101a, a reader/writer 103, a server 105a that acts as an external recording device, and a communications network 106 as main members.

The information processing system 100a according to the second embodiment includes an antenna 111 for cellular telephone communications or calls, and can access the server 105a by connecting to the communications network 106 via the antenna 111.

In other words, the information processing device 101a can execute applications possessing browser functions that can access information on the Internet, and in accordance with a request from a user, can connect to the communications network 106 and access the server 105a.

Therefore, data can be transmitted and received in both directions between the information processing system 100a and the server 105a via the communications network 106.

According to the second embodiment, an internal memory 130 storage area provided internally in the information processing device 100a and the IC chip storage area 120 held in the server 105a are used to read and write data in a secure manner and at high speed.

Information Processing Device 101a

With reference to FIG. 5, the information processing device 101a mainly includes an IC chip 110 including the internal memory 130 and other members, the antenna 111, a controller 117 and a cellular telephone circuit 119.

The controller 117 activates an application possessing browser functions or the like that is stored in a storage portion provided by the cellular telephone circuit 119, and, in accordance with instructions received via an input portion such as buttons pushed by the user or the like, performs processing of the data, including reading and writing the data and the like.

Also, according to the objective, the controller 117 controls and performs communications while switching between the wireless communications between the controller 117 and the IC chip, the wireless communications between the IC chip 110 and the reader/writer 103 or the wireless communications from the controller 117 via the antenna 111.

The cellular telephone circuit 119 includes the storage portion (not shown) that corresponds to a non-volatile memory or the like, an output portion (not shown) that can output data such as characters, images or sound or the like via a screen or speaker, an input portion (not shown) that corresponds to a button or rotating selector (a jog dial or similar dial) or the like As the cellular telephone circuit 119 is provided by the information processing device 101a, the user can select a telephone call function to make a call, or select a data communications function to perform data communications via the communications network 106.

The IC chip 110 according to the second embodiment is substantially the same as the IC chip 110 according to the first embodiment and thus a further explanation is omitted here.

Server 105a

As shown in FIG. 5, the server 105a includes a storage portion 116 that corresponds to a hard disk drive or the like, that is an external recording device that further includes a central processing unit (CPU) possessing computing and processing functions, an input portion, a communications interface connected to the external communications network 106, an output portion and the like (note that, most of these members are not specifically shown in the figure).

The server 105a can be connected to the communications network 106, and in response to requests from the information processing device 101a, for example, the server 105a can transmit data stored in the IC chip storage area 120 in the storage portion 116 to the information processing device 101a.

In the server 105a, as shown in FIG. 5, the IC chip storage area 120 for the IC chip 110 is contained in the storage area 116, and an IC chip control portion 113a formed of a program is also stored here. The structure of the IC chip storage area 120 may be, for example, a tamper-proof structure that does not allow the key data 121 to be easily manipulated or stolen.

When the server 105a is accessed by the information processing device 101a via the communications network 106, if the IC chip storage area 120 does not exist in the storage portion 116, in accordance with instructions from the data management portion 136 or the like, the IC chip control portion 113a may, for example, secure a specified area in the IC chip storage area 120 in the storage area in the storage portion 116, the data management portion 136 may generate the key data 121 for two-way authentication with the IC chip 110, and the IC chip control portion 113a may store the key data 121 in the IC chip storage area 120.

The IC chip control portion 113a is a program that is controlled by executing processing or the like by the CPU provided in the server 105a, and the IC chip control portion 113a uses the key data 121 stored in the IC chip storage area 120 to perform two-way authentication with the IC chip 110 via the communications network 106.

After the IC chip control portion 113a completes two-way authentication with the IC chip 110, it can read data from the IC chip storage area 120, and transmit the data to the IC chip 110 via the communications network 106.

Also, after the IC chip control portion 113a completes two-way authentication with the IC chip 110, it can receive data from the IC chip 110 via the communications network 106 and store the data in the IC chip storage area 120.

The example of the IC chip control portion 113a according to the second embodiment is explained above as a software, but the invention is not limited to this example, and the IC chip control portion 113a may be, for example, hardware formed of multiple semiconductor elements or the like.

Data Processing

Next, data processing by the information processing system 100a according to the second embodiment will be explained with reference to FIG. 6. FIG. 6 is a sequence diagram schematically showing the operations of the information processing system 100a according to the second embodiment.

As shown in FIG. 6, first, the user operates the input portion in the cellular telephone circuit 119 to activate the application and specify the service the user wishes to use.

Next, when the controller 117 has received the service specification via the input portion, the controller 117 sends a request to the IC chip 110 for two-way authentication between the IC chip 110 and the IC chip control portion 113a (step S601).

When the IC chip 110 receives the two-way authentication request from the controller 117, the IC chip 110 data management portion 136, in order to perform two-way authentication with the server 105a, sends a request to the controller 117 to form a connection with the communications network 106.

When the controller 117 connects to the communications network 106 via the antenna 111, the data management portion 136 transmits the two-way authentication request via the controller 117 to the connection destination server 105a (step S603).

When the IC chip control portion 113a provided by the server 105a receives the two-way authentication request via the communications network 106, it accesses the IC chip storage area 120 in the storage area 116, and reads the key data 121 (step S605).

When the key data 121 is read from the storage area 116 (step S605), next, the IC chip control portion 113a starts the two-way authentication between the server 105a and the IC chip 110 (step S607).

Excepting that the two-way authentication is conducted via the communications network 106, the two-way authentication between the IC chip control portion 113a and the IC chip 110 (step S607) is essentially identical to the two-way authentication between the IC chip control portion 113 and the IC chip 110 according to the first embodiment (step S407).

Also, in the same way as the two-way authentication according to the first embodiment (step S407), when performing the above two-way authentication (step S607), the data management portion 136 and the IC chip control portion 113a may process the read key data 121 and 122 in accordance with specified algorithms or the like, and then use the processed data as the key data for the purpose of two-way authentication, or the like.

If the results of the two-way authentication between the IC chip control portion 113a and the IC chip 110 (step S607) confirm both to be authentic, two-way authentication is performed between the IC chip 110 and the server 105a.

When the two-way authentication process (step S607) is completed, the two-way authentication results are transmitted from the IC chip 110 to the controller 117 (step S609).

If the two-way authentication results indicate that two-way authentication is not confirmed, the controller 117, for example, cancels subsequent application processing relating to the specified service.

If the two-way authentication results confirm authenticity, the controller 117 instructs the IC chip 110 to read the data set (at least one block of data) relating to the service specified by the user to the cache area 132 (step S611). If, for example, the data set relating to the specified service is not stored in the IC chip 110 internal memory 130, but is stored on the server 105a side, it is necessary to read the data from the server 105a to the information processing device 101a side.

When the IC chip 110 receives the instruction from the controller 117 to read the data, the data management portion 136 sends a request to the controller 117 to connect to the communications network 106 in order to read the designated data from the server 105a.

When the controller 117 makes the connection to the communications network 106 via the antenna 111, the data management portion 136 sends a request to the connection destination server 105a to read the designated data (step S613). As the two-way authentication was completed normally, all following data communications between the IC chip 110 and the IC chip control portion 113a can be performed securely as the transmitted and received data are encrypted using the key data 121 and the key data 122.

Next, when the request is issued from the IC chip 110 to read the data (step S613), the IC chip control portion 113a reads the data designated by the request from the IC chip storage area 120 in the storage area 116 (step S615).

The data read in the above step S615 is transmitted by the IC chip control portion 113a to the IC chip 110 via the communications network 106 (step S617).

The data management portion 136 decrypts the data transmitted by the IC chip control portion 113a and stores the data in the cache area 132 in the internal memory 130.

Next, when the data is stored in the cache area 132 by the data management portion 136, the data management portion 136 notifies the controller 117 that the data has been read into the cache area 132 (step S619).

Next, when the IC chip 110, by receiving signals (beacon signals or the like) transmitted from the reader/writer 103 or a wired controller, detects the reader/writer 103 or other device (step S621), the IC chip 110 transmits a signal to the reader/writer 103 or other device indicating that it has been detected (step S623).

Next, authentication is performed between the IC chip 110 and the detected reader/writer 103 or other device (step S625). The authentication between the IC chip 110 and the reader/writer 103 or other device may, for example, be performed in the same way as for the above-described two-way authentication process between the IC chip 110 and the IC chip control portion 113*a*, but the invention is not limited to this example.

If the authentication process (step S625) is completed successfully, next, the IC chip 110 receives a request from the reader/writer 103 or other device (step S627) to read the data from the cache area 132.

The data designated by the read request (step S627) is, for example, data relating to the service specified by the user, such as information about points accrued by a points service, those points being calculated according to the value of the product purchased, and is data required by the reader/writer 103 or other device to provide the service, or the like.

When the data management portion 136 ascertains that the data designated by the data read request generated by the reader/writer 103 or other device exists in the cache area 132, the data management portion 136 transmits the target data wirelessly to the reader/writer 103 or other device via the antenna 144 (step S629). When the data is transmitted, it is, for example, encrypted by the data management portion 136 using the keys valid between the reader/writer 103 or other device and the IC chip 110.

Next, if the reader/writer 103 or other device requests processing of the data read into the cache area 132 such as updating the data, deleting the data and the like (or makes a write request) (step S631), the data management portion 136 processes the data in accordance with the processing request, and updates the target data in the cache area 132. The data management portion 136 notifies the reader/writer 103 or other device of the processing results via the antenna 144 (step S633).

In the same way, if there is a request from the reader/writer 103 or other device to once more process the data stored in the cache area 132, the IC chip 110 updates the data as described above. The updated data in the cache area 132 is held in the cache area 132 until the series of processes between the reader/writer 103 or other device and the IC chip 110 is complete.

From this point, as described above, until the series of processes between the reader/writer 103 or other device and the IC chip 110 end, the processes are repeated as in the above steps S621 to S633, including reading data from the cache area 132, updating data in the cache area 132 and the like.

Next, when the controller 117 confirms the end of the service, by, for example, the user terminating the service via an input button or the like provided as part of the cellular telephone circuit 119, the controller 117 once more requests the IC chip 110 to perform two-authentication between the IC chip 110 and the IC chip control portion 113*a* (step S635) in the same way as described above.

The two-way authentication process (step S635 to step S643) is essentially identical to the two-way authentication described above (step S601 to S609) and thus a further explanation is omitted here.

When the controller 117 receives notification that the two-way authentication has been completed normally (step S643), to obtain consistency between the data updated in the cache area 132 up to that time and the data stored in the IC chip storage area 120 in the server 105*a*, in other words, to mirror the updated data contents with the data stored in the IC chip storage area 120, the controller 117 sends a data write command to the IC chip 110 (step S645).

When it receives the instruction from the controller 117 to write the data (step S645), the data management portion 136 sends a request to the controller 117 to connect to the communications network 106.

When the controller 117 makes the connection to the communications network 106 via the antenna 111, the data management portion 136 instructs the IC chip control portion 113*a*, via the controller 117, to write the data (step S647). As the two-way authentication was completed normally, all following data communications between the IC chip 110 and the IC chip control portion 113*a* can be performed securely as the transmitted and received data are encrypted using the key data 121 and the key data 122.

When the IC chip control portion 113*a* receives the data write command from the data management portion 136, the IC chip control portion 113*a* updates the designated data on the IC chip storage area 120 so that it is the same as the updated data in the cache area 132 (step S649).

When the IC chip control portion 113*a* has completed updating all the data designated by the instruction received from the data management portion 136 (step S649), a write done response is generated to the IC chip 110 (step S651).

When the data management portion 136 receives the write done response from the IC chip control portion 113*a*, it generates a write done response to the controller 117 (step S653).

The series of operations by the information system 100*a* according to the second embodiment of the present invention are complete. Through the operations of the information processing system 100*a*, if the user specifies the service, the data relating to the specified service is read into and updated in the cache area 132, and the number of access operations between the server 105*a* and the IC chip 110 can therefore be reduced, allowing the impact on processing time to be reduced to a minimum. Also, the data recorded in the server 105*a* is encrypted, allowing the IC chip 110 internal memory 130 storage area to be expanded without any significant deterioration in the security level.

Modified Data Processing Example

Next, with reference to FIG. 7, an explanation will be given of a modified example for the operations of the information processing system 100*a* according to the second embodiment of the present invention. FIG. 7 is a sequence diagram schematically showing a modified example of the operations of the information processing system 100*a* according to the second embodiment.

Next, the points of difference between the modified data processing example of the information processing system 100*a* according to the second embodiment, and the information processing system 100*a* according to the second embodiment that has already been described will be explained in detail. An explanation of other points will be omitted here as they are essentially identical.

As shown in FIG. 7, first, the IC chip 110 detects the reader/writer 103 or the wired controller by receiving the signal (beacon signal or the like) transmitted by the reader/writer 103 or other device (step S701).

Next, the data management portion 136 in the IC chip, in order to perform two-way authentication with the IC chip control portion 113a, requests the controller 117 to connect to the communications network 106.

The following process relating to the two-way authentication (step S703 to step S707) is essentially identical to the two-way authentication process according to the second embodiment described above (step S603 to step S607) and thus a further explanation is omitted here.

Next, if the two-way authentication between the IC chip control portion 113a and the IC chip 110 is completed normally, the reader/writer 103 detection results, including the two-way authentication results, are transmitted to the reader/writer 103 or other device via the antenna 144 provided as part of the IC chip 110 (step S709).

Next, authentication is performed between the IC chip 110 and the detected reader/writer 103 or other device (step S711). As this authentication process is essentially identical to the authentication process described above (step S625), a further explanation is omitted here.

If the authentication (step S711) is completed normally, next, the IC chip 110 receives a data read request from the reader/writer 103 or other device (step S713).

The data designated by the data read request (step S713) is, for example, the data set (at least one block of data) required in a series of processes being performed from this point between the reader/writer 103 or other device and the IC chip 110 (step S723 to step S729).

When the data management portion 136 ascertains that the data designated by the data read request generated by the reader/writer 103 or other device exists in the IC chip storage area 120 in the server 105a, the data management portion 136, in order to send the data read request to the server 105a, sends a request to the controller 117 to form a connection with the communications network 106.

When the controller 117 connects to the communications network 106 via the antenna 111, the data management portion 136 commands the IC chip control portion 113a to read the target data from the storage portion 116 (step S715). All following data communications between the IC chip 110 and the IC chip control portion 113a can be performed securely as the transmitted and received data are encrypted using the key data 121 and the key data 122.

Next, the IC chip control portion 113a reads the data designated by the request from the IC chip storage area 120 in the storage area 116 (step S717).

The data read in the above step S717 is transmitted to the IC chip 110 via the communications network 106 by way of the controller 117 (step S719).

The data management portion 136 decrypts the data transmitted by the IC chip control portion 113a and stores the data in the cache area 132 in the internal memory 130.

Next, when the data is stored in the cache area 132 by the data management portion 136, the data management portion 136 notifies the reader/writer 103 or other device that the data has been read into the cache area 132 (step S721).

Then, the IC chip 110 receives a request from the reader/writer 103 or other device to write the data in the cache area 132 (step S723). As the processes following the step S723 (step S723 to step S729) are essentially identical to the processes according to the second embodiment described above (step S627 to step S633), a further explanation will be omitted here.

Next, when the series of processes between the reader/writer 103 and the IC chip 110, the processes including reading the data and writing the data, is complete, the reader/writer 103 instructs the IC chip 110 to end processing (step S731).

When the IC chip 110 data management portion 136 receives the instruction from the reader/writer 103 to end processing, in order to obtain consistency between the data updated in the cache area 132 up to that time with the data stored in the IC chip storage area 120 in the server 105a, the data management portion 136 requests the controller 117 to make a connection to the communications network 106.

When the controller 117 makes the connection to the communications network 106 via the antenna 111, the data management portion 136 sends a write data request to the IC chip control portion 113a via the communications network 106 (step S733). The processes relating to the above-described steps S733 to S737 are essentially identical to the processes according to the second embodiment described above (step S647 to step S651) and thus a further explanation is omitted here.

When the IC chip 110 data management portion 136 receives the write done response from the IC chip control portion 113a, it generates a write done response to the reader/writer 103 via the antenna 144 (step S739).

With regard to the information processing system 100 according to the first embodiment, the information processing system 100a according to the second embodiment, and the modified example of the information processing system 100a according to the second embodiment, one of a part of the series of processes or all of the series of processes described above may be performed using dedicated hardware or may be performed using software.

In the present specification, the processing steps of the program that causes a computer to perform the various processes do not necessarily need to be performed chronologically and in the order noted on the sequence diagrams, but may be performed in parallel or individually.

It should be understood by those skilled in the art that various modifications, combinations, sub-combinations and alterations may occur depending on design requirements and other factors insofar as they are within the scope of the appended claims or the equivalents thereof.

In the examples given in the above embodiments, the IC chip 110 has been described as a non-contact IC chip that communicates wirelessly with the reader/writer 103 or other device, but the invention is not limited to this example. The IC chip 110, for example, may alternatively be a contact IC chip.

Also, in the examples given in the above embodiments, the information processing device 101 has been described as a cellular telephone, but the invention is not limited to this example. The information processing device 101, for example, may alternatively be a personal digital assistance (PDA), a laptop personal computer or the like.

What is claimed is:

1. An information processing device comprising:
    an IC chip that includes a first storage area and that can read and process data from the first storage area, the IC chip performing non-contact communication with an external device that supplies power to the IC chip;
    a storage module that includes a second storage area provided externally to the IC chip; and
    a cellular telephone circuit that includes a third storage area and activates an application for establishing connection between the IC chip and the storage module, the cellular telephone circuit being different from the IC chip,
    wherein:
    key data is stored in the first storage area for, at least one of, the purpose of performing two-way authentication between the IC chip and the storage module, and the purpose of encrypting and decrypting data stored in the second storage area, a cache area is allocated to the first storage area to temporarily store data, and the IC chip, in accordance with a request from the external device, after performing the two-way authentication with the storage module based on the first key data, reads specified data, that is used to satisfy the request, from the second storage area into the cache area of the IC chip, and processes one of a part of the data and all of the data read into the cache area.

2. The information processing device according to claim 1, wherein the information processing device is a mobile terminal, and the storage module further comprises:

an access control portion included in the mobile terminal that performs two-way authentication with the IC chip and controls access to the second storage area in the storage module, wherein the second storage area is provided internally in a non-volatile memory that can perform processing on the data, the processing including reading, writing and deleting the data; and the IC chip reads encrypted data existing in the second storage area from the access control portion and processes the encrypted data.

3. The information processing device according to claim 2, wherein the non-volatile memory is a memory that can be removably attached to the information processing device.

4. The information processing device according to claim 2, wherein when data processing that extends over at least one processing step by the IC chip in accordance with the request from the external device is complete, the access control portion, in accordance with instructions from the IC chip, instructs that the processed data stored in the cache area is to be stored in the second storage area.

5. The information processing device according to claim 1, wherein the information processing device is a mobile terminal, and the storage module further comprises:

an access control portion provided externally to the mobile terminal, that performs the two-way authentication with the IC chip via a communications network and that controls access to the second storage area in the storage module, wherein the IC chip reads encrypted data existing in the second storage area from the access control portion via the communications network and processes the encrypted data.

6. The information processing device according to claim 5, wherein when data processing that extends over at least one processing step by the IC chip in accordance with the request from the external device is complete, the access control portion, in accordance with instructions from the IC chip, instructs that the processed data stored in the cache area is to be stored in the second storage area.

7. An information processing system comprising:

an external recording device comprising a first storage area; and an information processing device communicating with the external recording device via a communications network, the information processing device comprising:

an IC chip that includes a second storage area and that can read and process data from the second storage area, the IC chip performing non-contact communication with an external device that supplies power to the IC chip; and a cellular telephone circuit that includes a third storage area and activates an application for establishing connection between the IC chip and the external recording device, the cellular telephone circuit being different from the IC chip, wherein the external recording device includes an access control portion that performs two-way authentication with the IC chip via the communications network and that controls access to the first storage area, key data is stored in the second storage area for, at least one of, the purpose of performing two-way authentication between the IC chip and the access control portion of the external recording device and the purpose of encrypting and decrypting data stored in the first storage area, a cache area is allocated to the second storage area of the IC chip to temporarily store data, and the IC chip, in accordance with a request from the external device, after performing the two-way authentication with the access control portion via the communications network based on the key data, reads specified data that is used to satisfy the request from the external device from the first storage area into the cache area of the IC chip, and processes one of a part of the data and all of the data read into the cache area.

8. The information processing system according to claim 7, wherein the IC chip reads encrypted data existing in the second first storage area from the access control portion via the communications network and processes the encrypted data.

9. An information processing device that connects to an external recording device via a communications network, the external recording device comprising a first storage area, the information processing device comprising:

an IC chip that includes a second storage area and that can process data read from the second storage area, the IC chip performing non-contact communication with an external device that supplies power to the IC chip; and a cellular telephone circuit that includes a third storage area and activates an application for establishing connection between the IC chip and the external recording device, the cellular telephone circuit being different from the IC chip, wherein:

the external recording device includes an access control portion that performs two-way authentication between the first storage area and the IC chip via the communications network, and controls access to the first storage area, key data is stored in the second storage area for, at least one of, the purpose of performing two-way authentication between the IC chip and the access control portion of the external recording device and the purpose of encrypting or decrypting data stored in the first storage area, a cache area is allocated to the second storage area to temporarily store data, and the IC chip, in accordance with a request received from the external device via wireless communication, after performing the two-way authentication with the access control portion via the communications network based on the key data, reads specified data that is used to satisfy the request from the external device from the first storage area of the external recording device into the cache area of the IC chip.

10. The information processing device according to claim 9, wherein
the IC chip processes a part of the specified data or all of the specified data read into the cache area.

11. The information processing device according to claim 9, wherein
the specified data is to be performed between the external device and the IC chip.

12. The information processing device according to claim 9, wherein
the information processing device further comprises a controller; and
the specified data is transmitted to the IC chip via the communications network by way of the controller.

13. The information processing device according to claim 9, wherein
the information processing device and the external recording device perform a process to obtain consistency between data stored in the cache area and the first storage area.

14. A server connected, via a communications network, to an information processing device, the information processing device comprising:
an IC chip which includes a first storage area, the IC chip performing non-contact communication with an external device that supplies power to the IC chip; and
a cellular telephone circuit that activates an application for establishing connection between the IC chip and the server, the cellular telephone circuit being different from the IC chip,
the server comprising:
a storage portion comprising a control portion and a second storage area,
wherein:
the second storage area stores key data;
in response to a request transmitted from the information processing device, the control portion uses the key data to perform two-way authentication between the second storage portion and the IC chip, controls access to the storage portion, and reads from the second storage area specified data that is used to satisfy the request, the request been sent from the external device;
the server transmits specified data to the IC chip via the communications network.

15. The server according to claim 14, wherein
the specified data is stored in the first storage area; and
the IC chip processes a part of the specified data or all of the specified data.

16. The information processing device according to claim 14, wherein
the specified data is to be performed between the external device and the IC chip.

17. The information processing device according to claim 14, wherein
the information processing device further comprises a controller; and
the specified data is transmitted to the IC chip via the communications network by way of the controller.

18. The information processing device according to claim 14, wherein
the information processing device and the server perform a process to obtain consistency between data stored in the first storage area and the second storage area.

19. A system comprising:
a first device;
a second device wirelessly communicating with the first device, the second device comprising:
an IC chip that includes a first storage area and that can process data read from the first storage area, the first storage area storing first key data; and
a cellular telephone circuit that activates an application for establishing connection between the IC chip and the first device, the cellular telephone circuit being different from the IC chip, wherein the first device supplies power to the IC chip; and
a server including a storage portion comprising a control portion and a second storage area storing second key data, the server communicating with the second device via a communications network,
wherein:
the IC chip uses the first key data to perform two-way authentication between the IC chip and the server, controls access to the first storage area, receives a request from the first device, and transmits the request to the server via the communications network;
the control portion uses the second key data to perform two-way authentication between the IC chip and the server, controls access to the second storage area, receives the request from the IC chip, and transmits, in response to the request, specific data that is read from the second storage area to the IC chip; and
the IC chip, after receiving the specific data, stores the specific data in the first storage area.

20. A method for an information processing device to communicate with an external recording device via a communications network,
the information processing device comprising:
an IC chip that includes a first storage area and that can process data read from the first storage area; and
a cellular telephone circuit,
the external recording device comprising a second storage area and an access control portion for controlling the access to the second storage area,
the method comprising:
storing, by the IC chip, key data in the first storage area;
establishing, by the cellular telephone circuit, a connection between the IC chip and the external recording device;
performing, by the IC chip using the key data, two-way authentication between the IC chip and the external recording device via the communications network;
receiving, at the IC chip, a request from an external device via wireless communication, the external device supplying power to the IC chip;
reading, by the IC chip, specified data transmitted from the second storage area in the external recording device, the specified data being used to satisfy the request; and
storing, by the IC chip, the specified data into the first storage area.

21. A method for a server to communicate with an information processing device via a communications network,
the server comprising a first storage area and an access control IC for controlling the access to the first storage area,
the information processing device comprising:
an IC chip that includes a second storage area and that can process data read from the first storage area; and
a cellular telephone circuit,
the method comprising:
storing, by the access control IC, key data in the first storage area;

establishing, by the cellular telephone circuit, a connection between the IC chip and the server;

performing, by the access control IC using the key data, two-way authentication between the server and the information processing device via the communications network;

receiving, at the access control IC, a request from the information processing device, the request being transmitted from an external device via wireless communication to the information processing device, wherein the external device supplies power to the IC chip;

reading, by the access control IC, specified data, that is used to satisfy the request, from the first storage area; and transmitting, by the server, the specified data to the information processing device.

* * * * *